United States Patent
Rodler, Jr.

[15] 3,642,083
[45] Feb. 15, 1972

[54] POWERED STEERED WHEEL ASSEMBLY AND MOTOR VEHICLE EMPLOYING SAME

[72] Inventor: Waldo E. Rodler, Jr., 1488 Cherry Garden Lane, San Jose, Calif. 95125

[22] Filed: Jan. 30, 1970

[21] Appl. No.: 7,059

[52] U.S. Cl. ............................................. 180/31, 180/32
[51] Int. Cl. ................................................. B62k 11/00
[58] Field of Search ................ 180/31, 26 A, 26, 21, 44, 42, 180/13, 32, 23

[56] References Cited

UNITED STATES PATENTS 3,045,772   7/1962   Nicolai ............................... 180/31
502,820     8/1893   Jackson .............................. 180/26
2,317,412   4/1943   Shaffer ........................... 180/26 UX

FOREIGN PATENTS OR APPLICATIONS 921,941     1/1947   France ............................... 180/26

Primary Examiner—Kenneth H. Betts
Attorney—Fitch, Even, Tabin & Luedeka

[57] ABSTRACT

A motor vehicle and a powered steered wheel assembly therefor are described in which a rotary steered wheel is turned by a fork and steering column arrangement supported by the vehicle frame, and in which a drive train, mounted to the vehicle frame, is coupled to the axle of the steered wheel by a universal joint. The universal joint has its universal center lying in the rotational plane of the steered wheel.

8 Claims, 3 Drawing Figures

POWERED STEERED WHEEL ASSEMBLY AND MOTOR VEHICLE EMPLOYING SAME

This invention relates to motor vehicles and, more particularly, to a motor vehicle having a powered steering wheel assembly, such as a two-wheeled vehicle in which the front steered wheel is positively driven.

With more available leisure time, many persons are becoming increasingly involved in outdoor recreational activities. Activities such as the exploration of wilderness areas, hunting, and fishing are enjoying more and more popularity.

The rigors of travel on foot in rugged terrain while carrying supplies, firearms or fishing equipment do not appeal to many persons accustomed to the comforts of modern civilization. Accordingly, there is a demand for rugged, lightweight, low-cost vehicles capable of traveling cross country in rugged terrain with reliability. Vehicles of various types have been developed for this purpose and have been commercially successful. A demand still exists, however, for a lightweight, low-cost motor vehicle capable of transporting an individual cross country in rugged wilderness terrain.

Two-wheeled vehicles have been developed in which both the front and rear wheels are positively driven. Such vehicles are particularly suited to travel cross country in rugged terrain because of the added traction and stability provided by all-wheel drive and their narrow width allows them to pass through undeveloped areas impassable for wider vehicles with four or more wheels. Since two-wheeled vehicles are typically steered through a steering column and fork arrangement supporting the front wheel, the problem of providing positive drive for the front wheel at all positions of the wheel becomes complicated. Prior art two-wheeled vehicles providing all-wheel drive have included motors or other power sources mounted to the front wheel or supporting fork to be thereby capable of turning with the front wheel as it is steered to simplify the driving connection between the motor and the wheel. Where the rear wheel is also to be driven, such an arrangement thereby requires two power sources or motors, considerably increasing the expense of the vehicle. Moreover, the added weight of a power source or motor on the front wheel or fork introduces a degree of instability in steering the vehicle which is undesirable.

It is an object of the present invention to provide an improved motor vehicle and an improved powered steered wheel assembly therefor.

Another object of the invention is to provide an improved two-wheeled motor vehicle in which both wheels are positively driven.

A more particular object of the invention is to provide a powered steered wheel assembly for a motor vehicle in which a steered wheel may be positively driven from a power source or motor mounted on the vehicle frame.

It is another object of the invention to provide a powered steered wheel assembly for a two-wheeled vehicle wherein the steered wheel is positively driven and wherein problems associated with the balancing of the vehicle during steering are minimized.

Other objects of the invention will become apparent to those skilled in the art from the following description taken in connection with the accompanying drawings wherein.

Figure 1:
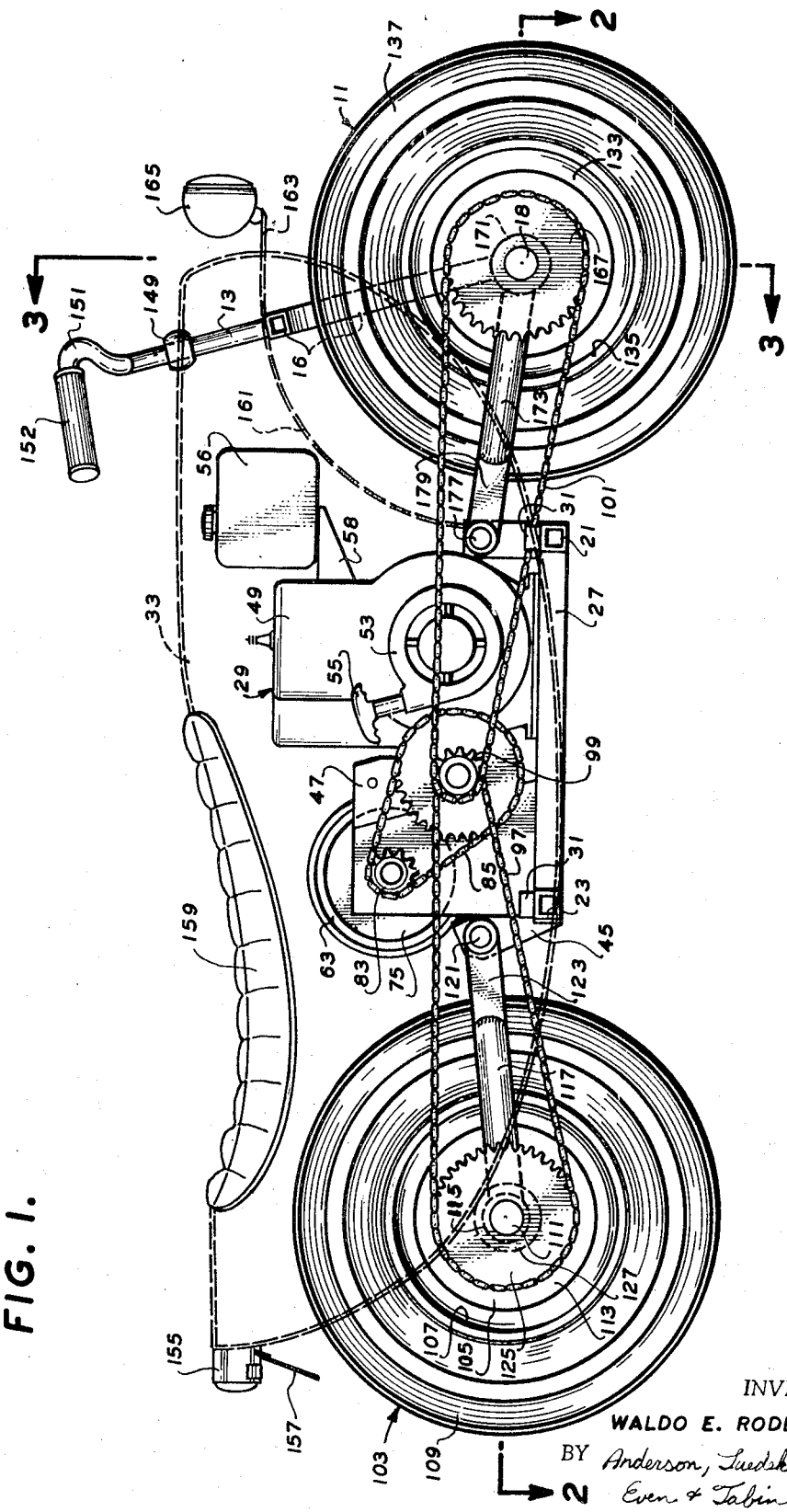
FIG. 1 is an elevational side view of a vehicle incorporating the invention, showing part in phantom for clarity.

Very generally, the powered steered wheel assembly of the invention comprises a rotary steered wheel 11 including an axle 12. A steering column 13 is supported on the vehicle frame 14 and a fork 16 connects the steering column to the axle for turning the rotational plane of the wheel about the axis of the steering column. A drive train 17 is mounted to the vehicle frame and includes a drive shaft 18 with an axis of rotation which intersects the axis of rotation of the steered wheel. A universal joint 19 couples the drive shaft and the axle. The universal joint has a universal center lying in the rotational plane of the steered wheel. Although the invention is described herein in connection with a two-wheeled vehicle, the invention is not limited to use on such a vehicle, but may be employed also on vehicles of three or more wheels.

Referring now more particularly to the drawings, the frame 14 includes a pair of crossbeams 21 and 23 joined by a pair of longitudinal beams 25 and 27 welded at their ends to the crossbeams. The beams 21, 23, 25 and 27 form a chassis for supporting a motor 29 and its associated elements. Brackets 31 are provided, two on each of the transverse beams 21 and 23, for securing a molded glass fiber body 33 (shown in dotted lines in FIG. 1) to the motor chassis, the body 33 there constituting a part of the frame 14 of the vehicle. Three torsion bar support brackets 35, 37 and 39 are welded to the forward transverse beam 21. Similarly, three torsion bar support brackets 41, 43 and 45 are welded to the rear transverse support beam 23. A U-shaped brake support bracket 47 is welded to the transverse beam 23 and to the longitudinal beams 25 and 27.

The motor 29 may be of any suitable type. The motor illustrated is the internal combustion type and includes an engine block 49 supported by a mounting plate 51 which extends between the longitudinal beams 25 and 27 of the motor chassis. A starter 53 is appended to the engine block 49 and includes a hand pull 55 for manually starting the engine. If desired, an electric starter may be provided. A fuel tank 56 is mounted to the engine block on a bracket 58.

The drive shaft 57 of the motor 49 is coupled through a centrifugally controlled driving pulley or clutch 59 to a belt 65. The belt 65 drives a spring-loaded driven pulley 63. The pulley 63 is mounted on an idler shaft 67 and a disc brake consisting of a hub 77, a disc 75 and a caliper assembly 79 of any suitable construction is also provided on the shaft 67 for braking the vehicle. Control of the brake and the centrifugally controlled clutch 59 may be of any suitable hand or foot control, not illustrated. The idler shaft is supported by the brake support bracket 47 in bearings 71 and 73. The disc 75 is mounted by the hub 77 to the shaft 67. A cable 81 is provided for controlling the brake.

A sprocket 83 is mounted to the end of the idler or brake shaft 67 and is coupled through a chain 85 to a sprocket 87 on a shaft 89. The shaft 89 extends from a bearing housing 91 in which suitable bearings, not shown, are contained in order to provide support for the shaft 89. The shaft 89 continues past the sprocket 87 at 93 and is provided with a sprocket 95 thereon which drives a chain 97 for coupling power to the rear wheel as will be explained. An additional drive sprocket 99 is provided on the shaft portion 93 which drives a chain 101 for providing power to the front wheel of the vehicle as will be explained.

The rear wheel 103 of the vehicle includes a wheel flange 105 and a tire rim 107 surrounding the flange. A tire 109 is mounted to the tire rim 107 and preferably the tire is of the type which is relatively large and which may be underinflated for superior traction in rough terrain. An axle 111 is coupled to the wheel 103 at the wheel flange by a mounting flange 113. The rear wheel rotates about the axis of the axle 111 in a plane of rotation or rotational plane which is perpendicular to and bisects the axis of rotation of the rear wheel, passing through the center of the wheel flange 105 perpendicular to the paper in FIG. 2.

Suspension for the rear wheel 103 and rear axle 111 is provided by an axle housing 115 supported from a suspension arm 117. The suspension arm 117 is attached to a suspension arm sleeve 119 which is rotatably supported on a torsion bar 121. The torsion bar 121 is supported in the torsion bar support brackets 41, 43 and 45 and the sleeve 119 is located between the brackets 43 and 45. The torsion bar 121 is coupled to the support arm 117 by a torsion arm 123 which is rigidly secured to the end of the torsion bar 121. The torsion bar 121 is free to rotate in the brackets 43 and 45 but is rigidly secured to the bracket 41. Accordingly, the torsion exerted on the bar permits the bar to be strained torsionally along its full length between the bracket 41 and the torsion bar arm 123. The rear wheel drive chain is coupled to the rear axle 111 through a rear wheel drive sprocket 125 mounted to the rear axle 111 by a mounting hub 127.

Figure 2:
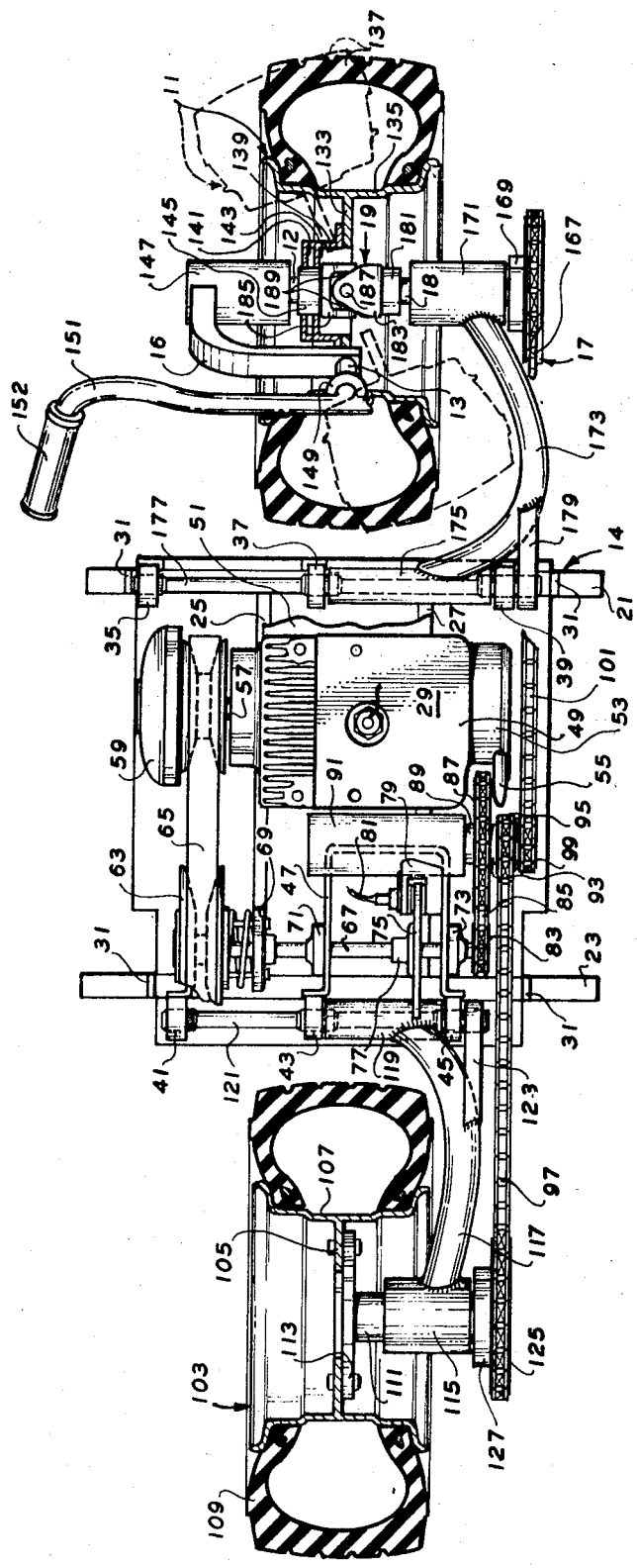
FIG. 2 is a sectional view taken along the line 2—2 of FIG. 1 but with the sectional plane being staggered in certain regions, and with parts being broken out, for clarity.

The front wheel 11 of the vehicle is the steered wheel of the vehicle in that it is used for turning the vehicle. A displaced position of the wheel 11 is shown in FIG. 2 in phantom and represents the position of the wheel in turning the vehicle to the left. The wheel 11 includes a flange 133 and a tire rim 135 surrounding the same. The tire rim 135 supports a tire 137 thereon which is of the same type as the tire 109 used on the rear wheel 103. The axle 12 of the front wheel 11 is connected to the wheel by a cup-shaped arrangement including a cylindrical element 139 joined at one end about a central opening in the wheel flange 133 and joined near its other end by a pair of discs 141 and 143. The discs 141 and 143 support a mounting collar 145 which is attached to the axle 12. The axle 12 is supported for rotation in an axle housing 147 which encloses suitable bearings for the axle. The front wheel rotates about the axis of the axle 12 in a plane of rotation or rotational plane which passes through the center of the wheel flange 133 perpendicular to the paper in FIG. 2. Other types of wheel designs may also be used in accordance with the invention.

The steering mechanism for the vehicle includes a fork 16 which, for reasons explained below, includes only a single tine connecting a steering column 13 to the axle housing 147 for rotatably supporting the axle 12. The steering column 13 is supported for rotation in a steering column bearing 149 which is supported by the frame of the vehicle and, more particularly, by the molded body 33 thereof. The steering column 13 is free to move both axially and rotationally with respect to the bearing 149. The upper end of the steering column 13 includes a handlebar 151 having a pair of grips 152 thereon by which the steering column may be rotated in order to turn the steered wheel 11. Various control elements (not shown) for the vehicle such as a throttle, handbrake, gearshift or handclutch may be suitably mounted to the handlebar 151.

Returning now to the molded body 33, provision is made on the body for mounting a rear light 155 and license plate 157 and for supporting the steering column bearing 149. In addition, a suitable depression is molded into the top of the body 33 and a padded seat 159 is provided therein. The body includes an internal curved mudguard 161 adjacent the front wheel 11. A bracket 163 extends from the front of the body 33 for mounting a headlight 165 thereon. Suitable connection, not shown, is made between the headlight 165, the taillight 155, and a generator, not shown.

In order to provide positive drive for the front wheel 11, the drive chain 101 is in driving engagement with a sprocket 167. The sprocket 167 is mounted by a collar 169 to the drive shaft 18. The drive shaft 18 is supported in a shaft housing 171 in which suitable bearings, not shown, are provided. The shaft housing 171 is suspended by a suspension arm 173 attached at its opposite end to a collar 175. The collar 175 is rotatably supported on a torsion bar 177 and surrounds the torsion bar 177. The torsion bar 177 is rotatably supported in the brackets 37 and 39 and is fixed at its end to the bracket 35. The opposite end of the torsion bar 177 is fixed to one end of a torsion arm 179 which joins the torsion bar with the suspension arm 173. Accordingly, torsion bar suspension for the shaft housing 171 is provided. As will become apparent from further explanation below, this also supports the front wheel 11. A collar 181 is attached to the drive shaft 18 and, as will be explained below, connects the drive shaft through the universal joint 19 with the wheel 11 for effecting a positive driving of the wheel in response to drive applied to the sprocket 167.

Obviously, when the front wheel 11 is turned to steer the vehicle as opposed to rotational turning or rolling, the plane of rotation of the front wheel is also turned. Since the plane of rotation of the front wheel is perpendicular to the axle 12, the aligned relationship between the axis of rotation of the axle 12 and the axis of rotation of the drive shaft 18 no longer exists. In order to provide positive coupling of the drive train including the drive shaft 18 to the axle 12 for rotating the wheel 11, the drive shaft 18 and the axle 12 are coupled by the universal joint 19. The universal joint 19 includes a yoke 183 connected to the collar 181 and a yoke 185 connected to the collar 145. A journal with two pairs of pivot pins 187 and 189 is included in the universal joint 19. The pivot pins in each pair are aligned on a common axis and the axes of the pairs are mutually perpendicular. The intersection of the axes constitutes the universal center of the universal joint. The pins 187 are pivotally connected to the arms of the yoke 183. The pins 189 are pivotally connected to the arms of the yoke 185. The universal joint 19 thereby constitutes a universal joint of the so-called Hooke type in which the universal point lies at the intersection of the axes of the pins 187 and 189.

Figure 3:
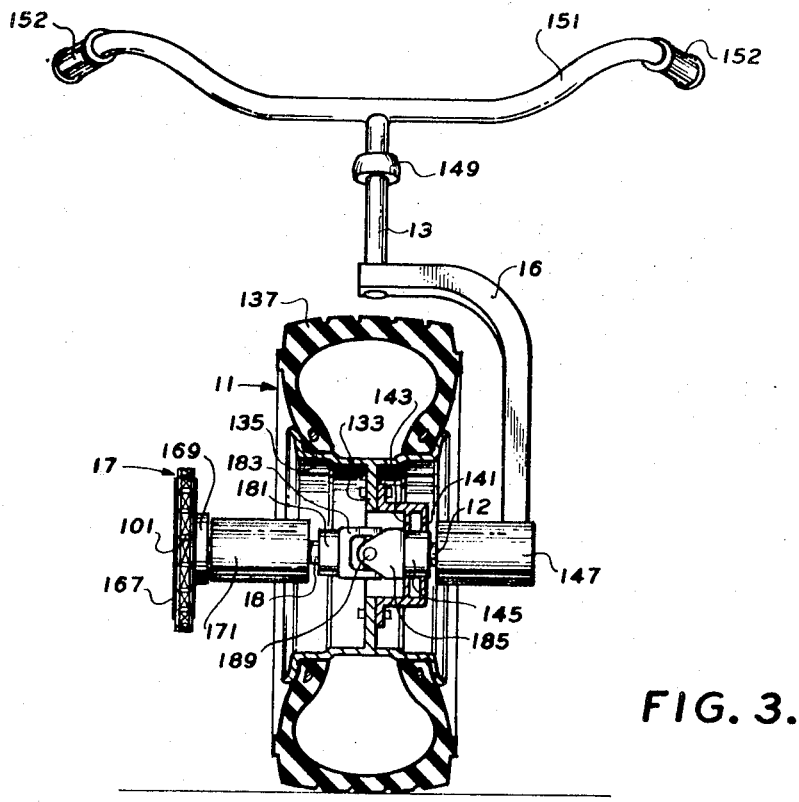
FIG. 3 is a sectional view taken along the line 3—3 of FIG. 1, with parts removed for clarity.

In order to maintain balance in the vehicle for all steering positions, the universal point is placed in the plane of rotation of the wheel 11. Additionally, in the illustrated apparatus, the universal point lies on the axis of the steering column 13. This latter relationship is not necessarily required since a slight caster angle may be provided by appropriately curving the lower end of the tyne of the fork 16 as is known in the art. To maintain proper vehicle balance, however, it is desirable that the universal point lie in an extension of the rotational plane of the rear wheel 103. In addition, it is desirable that the weight of the vehicle be centered about an axis plane through the vehicle which includes the plane of rotation of the rear wheel 103 and the plane of rotation of the steered wheel or front wheel 11 when the wheel is in the position shown in the solid lines of FIGS. 2 and 3.

By providing a vehicle and a steered wheel arrangement therefor as described, positive drive of both of the vehicle wheels may be effected from a single engine. Moreover, the positive drive of the steered wheel is such as to preserve steering balance throughout all positions of the wheel. The simple universal coupling arrangement enables a relatively small wheel diameter to be utilized and provides a relatively simple and straightforward means for achieving highly satisfactory operation. Although a universal joint of the so-called Hooke type is shown, other types of universal joints may be utilized, for example a ball and socket type of arrangement.

It may therefore be seen that the invention provides an improved motor vehicle and an improved powered steered wheel arrangement therefor. The powered steered wheel may be driven from a motor secured to the vehicle frame and the positive drive is effected in a relatively simple and low-cost arrangement. Proper balance for steering the vehicle is maintained throughout all positions of the steered wheel and synchronism between the driving of the steered wheel and other wheels of the vehicle is readily achieved.

Various modifications of the invention in addition to those shown and described herein will become apparent to those skilled in the art from the foregoing description and accompanying drawings. Such modifications are intended to fall within the scope of the appendant claims.

What is claimed is:

1. In a motor vehicle having a vehicle frame, a powered steered wheel assembly, comprising a rotary steered wheel including an axle, a steering column supported by said vehicle frame to be axially and rotationally movable with respect thereto, a fork connecting said steering column to said axle for turning the rotational plane of said wheel about the axis of said steering column, a drive train mounted to said vehicle frame and having a drive shaft with an axis of rotation which intersects the axis of rotation of said wheel, said vehicle frame including a resilient support for said drive shaft allowing displacement of said drive shaft transversely of the axis of rotation thereof, and a universal joint coupling said drive shaft and said axle, said universal joint having its universal center lying in the rotational plane of said wheel.

2. An assembly according to claim 1 wherein the universal center of said universal joint is aligned with the axis of said steering column.

3. An assembly according to claim 1 wherein said axle of said wheel is spaced from the rotational plane of said wheel and is secured to said wheel by a cup-shaped structure within which at least part of said universal joint is disposed.

4. an assembly according to claim 1 wherein said drive shaft is supported for rotation on an axis which is perpendicular to the axis of said steering column.

5. A motor vehicle comprising, a vehicle frame, a rotary rear wheel mounted to said frame, a rotary steered wheel including an axle, a steering column supported by said frame to be axially and rotationally movable with respect thereto, a fork connecting said steering column to said axle for turning the rotational plane of said steered wheel about the axis of said steering column, a power source mounted to said frame, a drive train mounted to said frame and coupled to said power source, said drive train having a drive shaft with an axis of rotation which intersects the axis of rotation of said steered wheel, said frame including a resilient support for said drive shaft allowing displacement of said drive shaft transversely of the axis of rotation thereof, and a universal joint coupling said drive shaft and said axle, said universal joint having its universal center lying in the rotational plane of said steered wheel.

6. A motor vehicle according to claim 5 wherein the axis of said steering column lies in a plane including the rotational plane of said rear wheel.

7. A motor vehicle according to claim 5 wherein the universal center of said universal joint lies in a plane including the rotational plane of said rear wheel.

8. A motor vehicle according to claim 5 including a further drive train coupling said power source to said rear wheel.

* * * * *